April 21, 1925.
A. R. BEHNKE
1,534,830
AUTOMATIC FAN VALVE
Filed Nov. 25, 1922    2 Sheets-Sheet 1
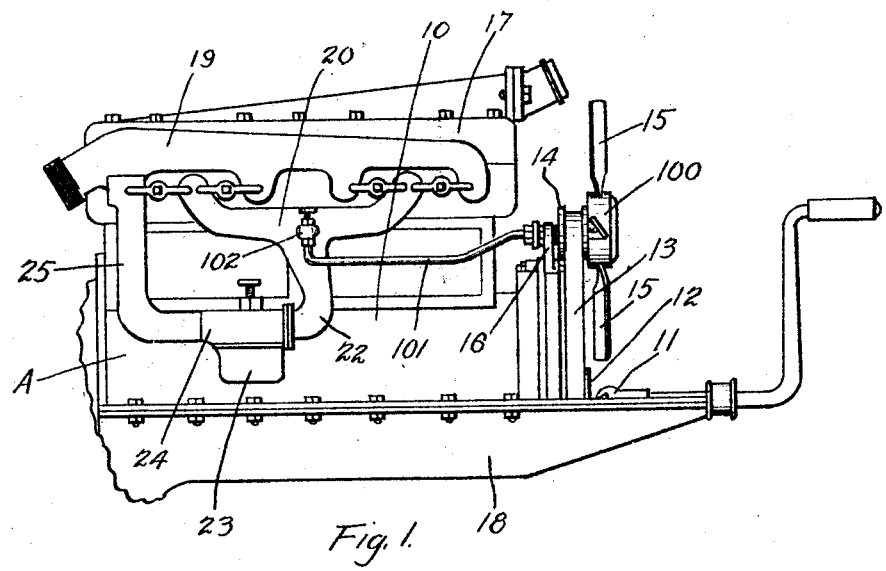
Fig. 1.
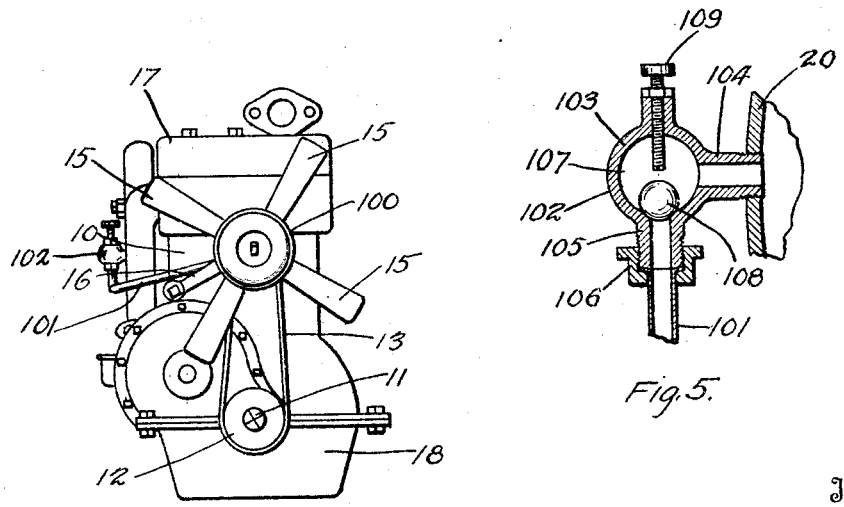
Fig. 2.
Fig. 5.
Inventor
Albert R. Behnke
By Fischer & Sagaard
Attorneys April 21, 1925.

A. R. BEHNKE 1,534,830

AUTOMATIC FAN VALVE

Filed Nov. 25, 1922

Inventor
Albert R. Behnke
By Fischer & Lagaard
Attorneys

Patented Apr. 21, 1925.

1,534,830

UNITED STATES PATENT OFFICE.

ALBERT R. BEHNKE, OF ST. PAUL, MINNESOTA.

AUTOMATIC FAN VALVE.

Application filed November 25, 1922. Serial No. 603,375.

*To all whom it may concern:*

Be it known that I, ALBERT R. BEHNKE, a citizen of the United States, residing at St. Paul, in the county of Ramsey and State of Minnesota, have invented a new and useful Improvement in Automatic Fan Valves, of which the following is a specification.

My invention relates to automatic fan valves and has for its object to provide a fan for an internal combustion engine which fan has positioned in the hub thereof a governor adapted to open and close a valve connected with the intake manifold of the engine so that an additional amount of air may be drawn into the engine as the same reaches a predetermined speed.

Another object is to provide a support having a drum mounted thereon which drum carries the blades of the fan of the engine and houses the governor and valve controlling the additional air to the intake manifold.

A still further object of the invention is to provide the support for said fan with a bore through the same, which bore terminates within the drum and has associated with it a valve operated by said governor which support is further connected by means of a flexible pipe to the intake manifold of the engine.

The full objects and advantages of my invention will appear in connection with the detailed description thereof and are particularly pointed out in the claims.

Fig. 1 is a side elevational view of an engine showing my invention applied thereto.

Fig. 2 is a front elevational view of the device shown in Figure 1.

Fig. 5 is a detail view of the check valve shown in Figure 1 and drawn to a larger scale.

Figure 3:
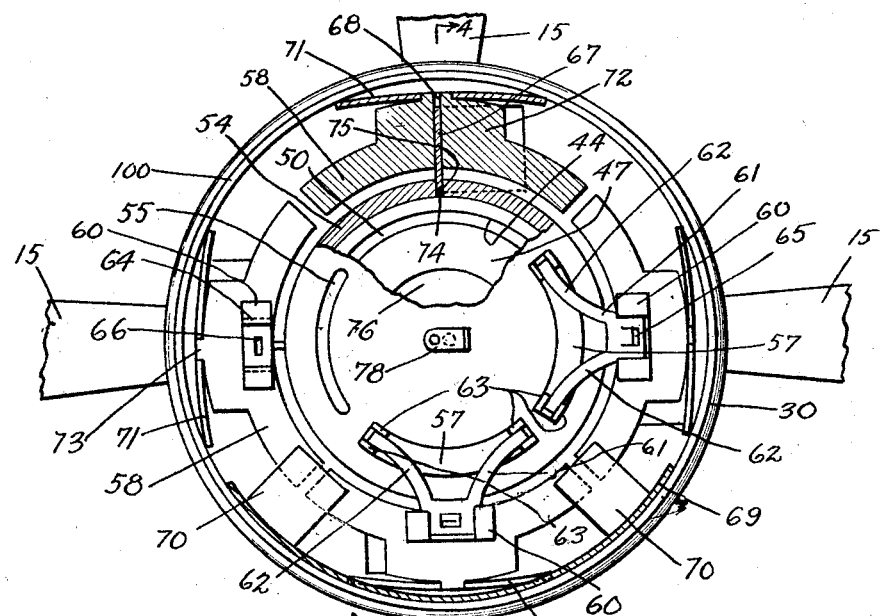
Fig. 3 is a front view of the fan proper with portions cut away to show the construction thereof and drawn to an enlarged scale.

In the construction of motor vehicles of the less expensive type where an auxiliary air governor is desired and where the same is installed in the factory, it is highly advantageous to employ a device which can take the place of some of the existing parts on the motor vehicle. My invention provides a structure which may be substituted for the ordinary cooling fan employed with motor vehicles so that the usual fan may be dispensed with and the cost of installation thereby reduced.

In Figures 1 and 2 is shown an internal combustion engine of ordinary construction. This engine is indicated at its entirety at A and comprises a cylinder block 10 in which is journalled a crank shaft 11 to which is attached a driving pulley 12. Pulley 12 drives through a belt 13, a fan shaft pulley 14 having attached to it a casing 100 on the periphery of which is mounted a number of fan blades 15 which form the fan of the engine. Pulley 14 is rotatably mounted upon a bracket 16 which is attached to the cylinder block 10. In conjunction with cylinder block 10 the same is further provided with a cylinder head 17 and a crank-case 18 which are attached thereto in the usual manner. To the exterior of the cylinder head 10 is attached an exhaust manifold 19 and an intake manifold 20 which are held in place by means of crow's feet 21 to communicate with the respective valve chambers and cylinder chambers of the engine in the customary manner. In the particular engine shown, intake manifold 20 is formed with a depending neck 22 which connects with a carburetor 23 having an air inlet 24 terminating in a heater 25 positioned adjacent the exhaust manifold 19.

The engine above described has been merely illustrated to show the application of my invention and it can readily be comprehended that the invention may be installed upon any other engine as will forthwith become apparent.

My invention consists of a governor and an air valve which are mounted within the casing 100 and which governor is adapted to be operated upon rotation of the pulley 14 by means of belt 13 to open and close the said valve as the speed of the engine varies. A pipe 101 is connected at one end to a check valve 102 which communicates with the intake manifold 20 while said pipe is connected at its other end with the valve within casing 100 so that, as the speed of the engine varies, the suction within the engine causes an additional amount of air to be drawn in through said valve and into the engine thereby reducing the fuel consumption and the formation of carbon within the engine.

Figure 4:
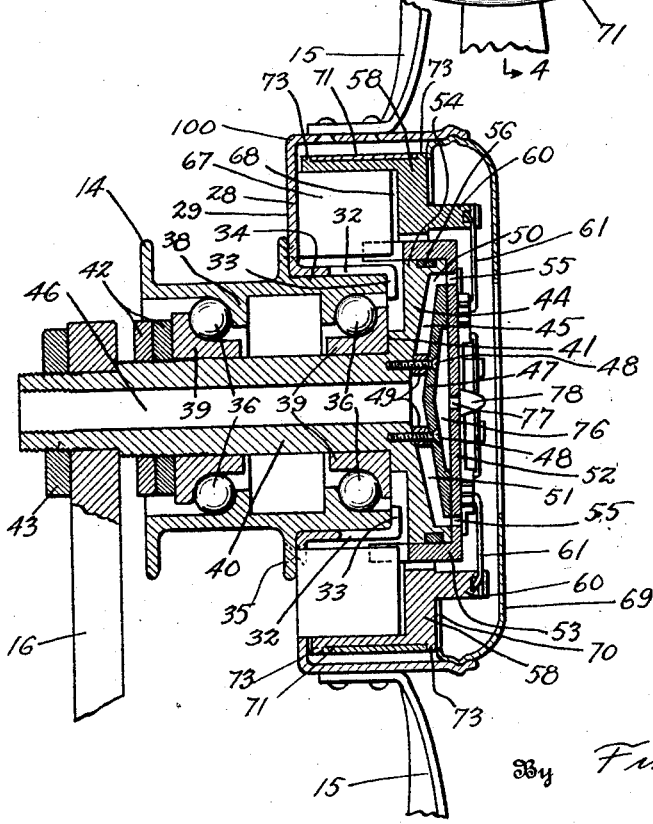
Fig. 4 is a sectional view taken substantially on line 4—4 of Figure 3.

The construction of the auxiliary air valve and governor of my invention is best comprehended from Figures 3 and 4. A circular casing 28 is provided which is formed with a back 29 and an outwardly-turned flange 30 extending completely around the same. At the center of the back 29 the same is pressed outwardly to form a number of inwardly-turned arms 32 which are formed with hooks 33 at the ends of the same. The pulley 14, previously referred to, is formed with a sleeve portion 34 which extends within arms 32 and butts against the hooked members 33. This sleeve and pulley are securely fastened to the back 29 of casing 28 by means of rivets 35. The interior of the pulley 14 and sleeve 34 is provided with inwardly-turned flanges 37 and 38 which are constructed to form cup-shaped ball races. In these races are rotatably mounted balls 36 which ride against cone races 39 cooperating therewith. The cone races 39 are supported upon a shaft or hollow spindle 40, one of the said cone races being held against a shoulder 41 formed on said spindle, the other being held in place by means of two lock nuts 42 screwable upon said spindle. Spindle 40 passes through arm 16 and is held in place thereon by means of a nut 43 screwed to the extreme end thereof. In this manner, a thrust bearing is provided which is capable of supporting the pulley 14 and the fan attached thereto for rotation.

The valve mechanism of the invention consists of a device which is attached to the end of the spindle 40. This spindle is formed with a circular head 44 rigidly connected therewith and extending outwardly beyond the hooked portions 33 of the arms 32. This head is formed with a dished opening 45 in the face thereof which opening communicates with an internal bore 46 passing through the center of the spindle 40. Within the dished opening 45, I provide a disk-like member 47, which is of diameter somewhat less than the opening 45 and which is held in spaced relation with the walls of said openings both along the rear and at the edges thereof by means of screws 48 having spacer washers 49 mounted thereon. This disk forms an annular opening 50 in the face of the head 44 which communicates by means of a passage 51 formed between the said disk 47 and head 44 with the bore 46, thus permitting the air to enter through the annular opening 50 and pass into the intake manifold of the engine.

Rotatably mounted upon the head 44 is a plate 52 having a flange 53 formed along the same which is adapted to cover the periphery 54 of the said head 44, as is clearly shown in Figure 4. This plate 52 is formed with a number of segmental annular openings 55 adapted to register with the annular opening 50 in the head 44 throughout the movement of the plate 52 upon said head 44. A packing ring 56 is positioned in the periphery of head 44 which engages the inner surface of the flange 53 of the plate 52 thereby providing an air-tight connection between said plate and head, so that air may enter the device only through openings 55 therein.

The valve mechanism of the invention consists of a number of arcuate shoes 57 which are adapted to be seated upon the face of the plate 52 to cover the openings 55, previously described. These shoes are adapted to be slid radially to cover or uncover the openings 55 by a centrifugal operating means in a manner now to be described so that the amount of air entering the intake manifold of the engine will be automatically regulated in accordance with the speed of the engine proper.

The structure for operating the valve shoes 57 consists of four weights 58 which may be formed curved, as shown in Figure 3, to occupy as little space within the device as possible. These weights are provided with raised lugs 60 issuing therefrom, which lugs support spring members 61 adapted to operate the shoes 57. The spring members 61 are formed with two fingers 62 which are adapted to spread outwardly and engage at their extreme ends the shoes 57 and which operate between lugs 63 formed on said shoes. The springs 61 are adapted to slide into T-shaped slots indicated in dotted lines in Figure 3 at 64 in the lugs 60. A hook 65 formed on said springs is adapted to engage into a notch 66 formed in the said lug 60 to securely hold the same in place, which hooks normally project outwardly beyond the surface of springs 61 so that, when the device is slid into place within the grooves 64, the said hooks 65 will register with the notches 66 to securely hold the springs 61 in place.

The weights 58 are guided in axial movement by means of a number of guides 67 which are formed from the body of the back 29 of casing 28 and bend inwardly into the said casing, the said guides being radially arranged as shown in Figure 3. These guides operate in slots 68 formed in the weights 58, which slots extend partially through the same. In addition to the said guides, the weights 58 slide between the back 29 of casing 28 and a ring 69 attached to the interior of the flanged portion 30 of casing 28, which ring is formed with a number of projections 70 issuing inwardly on the same and lying parallel with the back 29. By this means, the said weights are held and guided so that the same may slide radially of the device to move the shoes 57 to cover or uncover the openings 55 so as to permit or cut off the flow of air into the device.

For opposing the movement of the weights 58, I employ a number of leaf springs 71 which are attached to the device as follows: Near the support of the weights 58 the same are formed with radial extensions 72 which extend to within a short distance of the inner surface of the flange 30. These extensions have short lugs 73 attached to the same between which the springs 71 are adapted to lie. The said springs engage at their ends the interior of the flange 30, so that said springs become bent when the weights 58 are thrown outwardly by centrifugal force. This has the effect of regulating the amount of valve opening, so that the amount of air permitted to enter the intake manifold is proportional to the speed of the engine proper.

The method of causing the plate 52 to rotate with the casing 28 so as to always hold the valve shoes 57 in proper position relative to the openings 55 is as follows: The guide 67 which issues outwardly from the back 29 of the casing 28 is designed to extend toward the center of the said casing 28 beyond the weights 58, as indicated at 74. These extensions are adapted to ride in slots 75 formed in the edge of the flange portion 53 of plate 52. This forms a driving connection between the said plate and the casing 29. The slots 75 are preferably formed sufficiently large so that said plate 52 may move relative to the head 44 so that an irregularity in construction will not prevent the said plate from seating properly against the face of the said head and thereby permitting air to leak into the device when not desired.

For oiling the device a centrally located pocket 76 is formed in the disk-like member 47 which pocket forms an oil reservoir between the said member and the plate 52. This pocket communicates with the exterior by means of an oil hole 77 through which oil may be injected into the same. If desired, a sliding cover 78 may be used to cover the said oil hole when the same is wished to be closed. By this means the surface of the member 47 in the plate 52 which comes in contact constantly can be lubricated so that the device is at all times in perfect operating condition.

The construction of the valve 102 is shown in detail in Figure 5. This valve comprises a casing 103 which is formed with a neck threaded to screw into the intake manifold 20. Another neck 105 is provided with a coupling 106 by means of which the pipe 101 is connected therewith so that the said pipe is in communication with the chamber 107 formed within the casing 103. A ball 108 rests upon the opening through the neck 105 and normally closes the same. When the suction of the engine creates a vacuum in the chamber 107, ball 108 rises permitting air to be drawn through the pipe 101 and into the intake manifold 20. An adjusting screw 109 regulates the maximum amount of opening through the check valve 102 so that the maximum amount of air entering the engine through my invention may be varied at will.

The advantages of my invention are manifest. A device is provided which takes the place of one of the existing parts of the motor vehicle thereby eliminating the necessity of providing a totally new structure for producing the results desired and also utilizing an existing driving means for operating the invention. With the substitution of my invention for the ordinary fan, substantially no increase in the amount of power consumed in the operation of my invention is required. The fan blades may be attached to the casing of the governor proper so that, in general appearances, the device is similar to the ordinary fan.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:

1. In combination with a fan pulley of a motor vehicle, a casing attached to one of the flanges thereof, fan plates secured to the casing, a valve mechanism within the casing and a governor for operating said valve mechanism.

2. In combination with a fan pulley having a bearing positioned within one end thereof, a spindle journalled within said bearing enveloping a portion of the end of said fan pulley and bearing, a valve formed upon the end of said spindle, weights positioned within said casing surrounding the inward end of said fan pulley and means connected with said weights for operating said valve upon variations in speed of said fan pulley.

3. In combination with the intake manifold and fan pulley of a motor vehicle a casing secured to said pulley, fan blades attached to said casing, a governor positioned within said casing, a valve positioned within said casing and operated by said governor and means for connecting said valve with said intake manifold.

4. In combination with the intake manifold and fan pulley of a motor vehicle a circular casing secured to said fan pulley, fan blades attached to and issuing outwardly from the periphery of said casing, a support for said fan pulley, a passageway leading through said support, a valve positioned at the end of said support communicating with said passageway, a governor within the casing adapted to control said valve and means for connecting said passageway in said support with said intake manifold.

5. A fan valve comprising a circular casing, fan blades issuing outwardly from said casing, a pulley attached to said casing coaxially positioned relative thereto, a governor within the casing, a valve positioned within said casing and controlled by said governor and air conducting means communicating with said valve and passing through the axis of said casing and pulley.

6. A fan valve comprising a sleeve, a flange formed on one end thereof, a second flange formed near the middle of said sleeve, a casing adapted to fit over said sleeve being attached to said second flange, a spindle passing through said sleeve, means for journalling said sleeve upon said spindle, a valve attached to the end of said sleeve and positioned within said casing, governor weights positioned between the inwardly projecting portion of said sleeve and the exterior of said casing and means operable by said weights for operating said valve.

7. A fan valve comprising a spindle, a passageway extending axially through said spindle, a valve positioned at one end of said spindle, a pulley journalled upon said spindle, a casing attached to said pulley and enclosing said valve, a governor positioned within said casing for controlling said valve and fan blades attached to said casing.

8. In combination, an intake manifold, a fan pulley, a tubular pivot for said pulley, a tube connecting said manifold with the tubular pivot, and means on said pulley for controlling the entrance of air into said tubular pivot, said means comprising a member movable in one direction by a spring, and in the other direction by centrifugal force.

9. In an internal combustion engine having an intake manifold, a rotatable fan pulley, and a tubular pivot for said pulley, a tube connecting the tubular pivot with the manifold, a plate covering the front side of said pulley and provided with an air opening for permitting air to enter the tubular pivot, a member slidable on said plate and adapted to cover and uncover the opening therein, spring means for moving said member in one direction, and means including a weight for moving the plate in the direction opposed by the spring.

10. In an internal combustion engine having an intake manifold, a rotatable fan pulley, and a tubular pivot for said pulley, a tube connecting the tubular pivot with the manifold, a plate covering the front side of said pulley and provided with an air opening for permitting air to enter the tubular pivot, a pair of parallel guides carried on said plate, a member slidable in said guides and adapted to cover and uncover said opening, a spring connected to said plate and said slidable member, and adapted to move the same in a direction in which the opening will be covered, and centrifugally operated means for moving said slidable member in the direction for uncovering said opening when the engine runs.

ALBERT R. BEHNKE.